Patented June 23, 1942

2,287,416

UNITED STATES PATENT OFFICE 2,287,416

PRODUCTION OF IMPROVED PIGMENTS

Curtis Marshall Dann, Wilmington, Del., assignor to E. I. du Pont de Nemours & Company, Wilmington, Del., a corporation of Delaware No Drawing. Application May 2, 1940, Serial No. 332,979

6 Claims. (Cl. 106—309)

This invention relates to a process for the production of improved pigments. More particularly it relates to the manufacture of pigments having improved properties of mixing in oily vehicles, resins, plastics, and the like. Still more particularly it relates to the production of pigment materials of improved fineness and texture, adapted for direct use through simple mixing in coating compositions, such as enamel, flat, or eggshell types of paints, without prolonged milling in the composition vehicle as heretofore required. Still more particularly it relates to an improved method of preparing pigments especially suited for the making of gloss paints.

In the preparation of pigment materials, particularly those of inorganic character, almost every process involves the step of washing or suspending in water followed by partial dewatering such as filtering and drying. It is practically impossible to prepare an aqueous pigment suspension of such purity that no soluble salts are deposited when the last part of the water is evaporated in the drying step. These deposits almost invariably act as cementing mediums which hold the fine primary pigment particles in firm agglomerates, known to the pigment and paint manufacturers as grit. This grit is universally recognized as undesirable in high grade pigment products because it not only diminishes the efficiency of the pigment as a covering or tinting agent but mars the surfaces of paint films, particularly gloss paint films. Since practically all pigments prepared by simple dewatering and drying contain grit it is necessary to further treat the products by such steps as dry grinding and disintegration or to subject the paint, etc. made with the pigment to severe grinding. Both types of treatment would be avoided if possible because of their expense and bad effect on pigment color.

The surface characteristics of pigment particles are very important in determining the ease with which the pigment may be incorporated in an oily liquid, resin, rubber, etc. Some pigments naturally have lyophilic surfaces which are readily wet with oils and therefore mix easily with paint vehicles. The more modern white pigments, particularly the extended titanium pigments have rather lyophobic surfaces and mix rather poorly with oils. Various surface treatments have been employed to increase this attraction between those pigments and the various oily vehicles. By increasing this attraction better mixing as well as a more durable bond between pigment and binder is obtained. These treatments generally comprise coating the surface of the particles with some lyophilic substance, e. g., an organic compound such as a metallic soap, fatty acid, or fatty acid derivative, which is insoluble in water but soluble in linseed oil, resin, etc. The treatments are usually accomplished by adding these substances, known generally as wetting agents, to the dry pigment. However, said prior art treatments do not provide pigment materials possessing such uniformity of particle size, texture, fineness, and wetting characteristics, as to be adapted for direct incorporation by simple mixing in all types of coating compositions. Thus, the texture and particle size of pigment materials so obtained will be in such unsatisfactory state that they can not be used in enamel, flat, or eggshell type paints, or in aqueous compositions, such as casein paints, wherein the obtainment of smooth, unbroken, glossy films is essential, without recourse to a time consuming paint grinding step to incorporate the pigment in the vehicle, reduce its particle size, and produce an enamel or other type of paint of satisfactory texture.

I am aware that U. S. Patent 2,138,048 discloses a process for drying pigments which comprises slowly adding a very thin aqueous suspension of the pigment to a hot, water-immiscible liquid and distilling of the water along with some of the water-immiscible liquid. I am also aware that U. S. Patent 2,138,049 discloses a process which comprises adding a water-immiscible liquid to a thin aqueous pigment suspension, forming an emulsion, and evaporating both liquids. I am also aware that U. S. Patent 2,152,716 discloses a process comprising mixing a thick slurry of pigment, e. g. filter cake, with a water-miscible organic liquid having a boiling point higher than that of water and evaporating the water and at least some of the organic liquid. While the processes disclosed in the above patents produce pigment materials having improved texture, none produces a pigment material adapted to direct mix-in without subsequent milling of the coating composition to incorporate the pigment in the vehicle. Furthermore, in the case of U. S. Patents 2,138,048 and 2,138,049, the aforementioned processes involve the expensive evaporation of large quantities of water and are therefore commercially applicable to the preparation of only the most expensive pigments.

The following tests are given for the evaluation of pigments for ease of mixing, wetting characteristics, and ability to produce glossy films.

MIX-IN PIGMENT PARTICLE SIZE

The term "Mix-in pigment particle size," as employed herein and in the appended claims, refers to the size of the discrete particles and aggregates of a pigment in a paint composition prepared by simple mixing of dried finished pigment and paint vehicle. More particularly, it relates to the number of discrete pigment particles and aggregates of pigment particles in .00025 cubic centimeter of said paint composition, containing 0.1163 per cent of pigment by volume, which are larger than a predetermined size such as 6 microns, 8 microns or 15 microns in diameter.

To determine mix-in pigment particle size, 500 grams of pigment and approximately 100 grams of a linseed oil vehicle consisting of 52% by weight of "Z" body kettle bodied linseed oil of 11 acid number and 48% by weight of petroleum spirits, as defined by A. S. T. M. Tentative Standard D235-26T issued in 1926, are mixed for 20 minutes in a pony mixer of the type referred to on page 1283 of Perry's "Chemical Engineers' Handbook" (1934). Said mixer is provided with a receptacle or pot 7 inches in diameter and 5 inches deep rotating at the rate of 60 revolutions per minute, the paddles of said mixer rotating in the reverse direction at the rate of 64 revolutions per minute. The actual weight of linseed oil vehicle employed varies with the nature of the pigment being tested. The linseed oil vehicle is added to the 500 grams of pigment in just sufficient amount so that the paste obtained at the end of 20 minutes mixing in the aforementioned pony mixer gives a penetrometer reading of 25 mm. with 150 grams load, when tested according to the procedure outlined on pages 596-597 of the 8th (January, 1937) edition of "Physical and Chemical Examination of Paints, Varnishes, Lacquers and Colors," by Henry A. Gardner, and employing the cone type penetrometer specified for A. S. T. M. Tentative Standard D217-27T, described on pages 930-35 of the "Proceedings of the American Society for Testing Materials," vol. 27, part I, (1927). The sides and paddles of the pony mixer are scraped down at the end of 1 minute of mixing time, and again at the end of the 20 minute mixing period. An additional quantity of the aforementioned linseed oil vehicle is then added to the paste in amount sufficient to provide 250 grams of said vehicle in the paste; the mixture is stirred for an additional minute in the pony mixer and is then removed from said mixer. A sample of said mixture is diluted to a concentration of 1.163 cubic centimeter pigment per liter of thinned paint by stirring with an additional amount of the linseed oil vehicle used in the preparation of said paste. The weight in grams of pigment in one liter of the thinned paint will be 1.163 times the specific gravity of the pigment. A sample of the thinned paint so obtained is placed in a 100 micron deep glass cell and examined at 500 diameters magnification using transmitted light from a carbon arc. A pigment, which by this test shows less than 100 particles per 0.00025 cubic centimeter of thinned paint that are larger than $n$ microns in diameter, and not more than one particle that is larger than $n+5$ microns in diameter, is defined as having a mix-in pigment particle size of $n$ microns. It is to be understood that these particles thus observed include both primary particles and aggregates that have not been dispersed in the mixing operation. A pigment, which by this test shows less than 100 particles per 0.00025 cc. of thinned paint that are larger than 6 microns in diameter and not more than 1 particle that is larger than 11 microns in diameter, is defined as having a mix-in pigment particle size of 6 microns and may readily be incorporated in a paint vehicle by simple mixing to produce a paint which forms paint films of a perfect mirror-like appearance. A pigment which shows less than 100 particles that are larger than 8 microns and not more than 1 particle larger than 13 microns per 0.00025 cc. is defined as having a mix-in pigment particle size of 8 microns and may readily be incorporated in an enamel paint vehicle by simple mixing to produce an enamel paint which forms a smooth glossy paint film eminently suited for high grade enamel finishes. A pigment which shows less than 100 paritcles that are larger than 15 microns and not more than 1 particle larger than 20 microns is defined as having a mix-in pigment particle size of 15 microns and is particularly adapted to making flat paints of the interior wall finish type and may readily be incorporated in a paint vehicle by simple mixing to produce a paint which forms films of smooth unbroken surface without any irregularities visible to the naked eye.

It is to be understood that the values for mix-in pigment particle size as herein above determined differ markedly from those for pigment particle size as heretofore determined by prior art testing methods. Mix-in pigment particle size is an actual measure of the fineness of a pigment incorporated in an organic coating composition by simple mixing without milling of said coating composition. On the other hand, prior art pigment particle size measurements give particle size results which in practice are only obtained with difficulty, if at all, after prolonged milling of pigment and coating composition vehicle in such milling devices as pebble mills, paint roller mills, and the like. In preparing the pigment sample for particle size determination by prior art methods, for example, by the Tentative Standard Method E-20-23-T, appearing at pages 989-995 of "American Society for Testing Materials, Proceedings of the Thirty-Sixth Annual Meeting" vol. 33, part I (1933), the pigment is dispersed in the vehicle on a microscope slide by prolonged and severe rubbing which effects subdivision or removal of all cemented pigment aggregates. In paint manufacturing practice, however, said aggregates are not broken down by simple mixing of pigment and vehicle and, in fact, often persist after prolonged milling of the pigment in the vehicle.

FILM PARTICLE COUNT

The term "Film particle count," as employed herein and in the appended claims, refers to the number of particles and aggregates which appear as objectionable grit in a dried film of a paint composition prepared by simple mixing of a dried finished pigment and a paint vehicle. More particularly, it relates to the number of projections above the surface of said film having diameters of 50 microns or more. It is understood that these projections include both the pigment material and the adhering layer of vehicle; probably not more than half of the diameter of the protruding particle is due to the pigment.

A suitable method for determining film particle count comprises mixing 500 grams pigment and sufficient vehicle consisting of 75% by weight "Z" body kettle bodied linseed oil of 11 acid number, and 25% by weight petroleum spirits as defined by A. S. T. M. Tentative Standard D235-26T issued 1926, to provide a pigment-vehicle mixture comprising 35.7% pigment by volume to 64.3% vehicle by volume, for 20 minutes in a pony mixer, such as set forth at page 1283 of Perry's 1934 "Chemical Engineers' Handbook," and provided with a receptacle or pot 7 inches in diameter and 5 inches deep, adapted to rotate at the rate of 60 revolutions per minute and the paddles of which pony mixer rotate at the rate of 64 revolutions per minute in the reverse direction. The sides and paddles of the pony mixer are scraped down at the end of 1 minute of mixing time and again at the end of the 20 minute mixing period. The thick pigment-vehicle mixture thereby produced is passed once through a three-roll paint roller mill having rolls 6 inches in diameter and with 0.003 inch clearance between said rolls. The first roll in said mill rotates at a speed of 21 revolutions per minute; the second at 63 revolutions per minute; and the third at 189 revolutions per minute. Passage of said mixture through the paint roller mill set with such wide clearance between the rolls effects little if any grinding of the pigment material, but does insure thorough and reproducible mixing of the pigment and vehicle. A 300 gram sample of the resultant mixed paint is diluted with more of the linseed oil petroleum spirits vehicle to provide a paint consisting of 17.6% pigment by volume and 82.4% of said vehicle by volume. Petroleum spirits are then added with stirring in sufficient amount to produce a paint having a consistency of 5.0N, as determined by the modified Stormer viscometer test described on pages 1272-77 of Perry's "Chemical Engineers' Handbook" (1934). The resultant paint is allowed to stand 20 hours, after which 0.7% by weight of 6% cobalt naphthenate drier and 1.8% of 24% lead naphthenate drier, on the basis of the vehicle weight, are added with stirring. The thinned paint is strained through a 48 thread per inch x 60 thread per inch cotton paint strainer and spun out on a "Pyralin" slide rotating at 480 R. P. M. The film so produced is allowed to dry in a dust-free atmosphere and is then examined at 20 diameters magnification, under illumination at an angle of 18° 26' 12", using a high intensity microscope lamp, and the number of projections, noted per 10 square centimeter of paint film, above the surface of said film having diameters of 50 microns or more, are counted. The numerical figure thereby obtained is defined as "film particle count."

TEXTURE

Texture may be defined as the hardness, shape and size of the individual pigment particles, and directly influences the type of paint or coating composition film which will be obtained when a pigment is milled in a given formulation, i. e., whether the film will be rough or smooth. An efficient test for determining texture and fineness of pigments comprises that outlined in "Physical and Chemical Examination of Paints, Varnishes, Lacquers and Colors" by Henry A. Gardner, 8th edition, pp. 511-512, January 1937. Briefly, this is as follows:

Using a spatula with a flexible blade (1½ by 6½ inches), the pigment is mixed with a quick drying varnish of fairly good wetting properties. The amount of pigment and varnish varies with the nature of the pigment. For titanium dioxide, about 1.5 grams of pigment and 1.8 cubic centimeters of varnish is used. The paste is given 50 double rubs, using strokes about 12 inches long. The paste is collected and respread after each 10 rubs. A wedge-shaped film is made on the glass by drawing a 3½ inch doctor blade, one end of which is resting on a steel strip 0.003 inch thick, over the paint. The film is allowed to dry in a dust-free atmosphere and is then examined under illumination at grazing incidence, using a high intensity microscope lamp. Grading is most conveniently done against standards and is based on the size and number of coarse particles projecting from the thin portion of the wedge film.

The value for texture thus obtained is a measure of the number of particles of the order of 10 microns, and may be defined by means of an arbitrary scale. The standards used range from "1" at the bottom of the scale (representing a film containing a large number of 10 micron particles and with a sand-like appearance), to "17" at the top of the scale (representing perfect texture properties and a film having a smooth and glass-like appearance, with practically no perceptible coarse particles). The intermediate standards represent gradual and evenly spaced graduations from one extreme to the other, a difference of one point being material in the scale.

PAINT GRIT

The values for paint grit herein were determined by a convenient and practical test for the semi-quantitative determination of coarse particles, comprising mixing 200 grams of pigment with 108 grams of a quick drying varnish. The resultant paste is passed once through a roll mill with the rolls set 0.0015 inch apart. Steel strips are used for setting the mill and are withdrawn before grinding. The ground paste is reduced to paint consistency by addition of 82 grams of the varnish to 265 grams of the paste and is allowed to stand 16 hours. A uniform film of the paint is made on glass by drawing over the paint a 3½ inch doctor blade, both ends of which are resting on steel strips 0.0015 inch thick. The film is allowed to dry in a dustfree atmosphere and is then examined under illumination at grazing incidence, using a high intensity microscope lamp, and compared for film fineness and for the presence of coarse gritty aggregates against a set of arbitrary standards.

The value for paint grit thus obtained is a measure of the number and size of particles protruding above the surface of the film, and is especially a measure of the quantity of grit particles above a size of 40 microns. The standards used range from "1" at the bottom of the scale (representing a film with extremely coarse particles and sand-like in appearance), to "18" at the top of the scale (representing perfect grit value and a film which is smooth and glass-like in appearance, with substantially no perceptible coarse particles). The intermediate standards represent gradual and evenly spaced graduations from one extreme to the other, a difference of one point being material in the scale.

Having defined certain descriptive terminology which is employed for a more complete understanding of this invention, a detailed description of said invention will now be given.

This invention has as an object the production of improved pigments. A further object is the production of pigments having improved wetting and mixing properties. A still further object is the production of mix-in pigment materials which are free from objectionable aggregates or gritty particles and will possess such superior fineness and texture characteristics as to be adapted for direct use by simple mixing in all types of coating composition vehicles, especially in enamel, flat, or eggshell types of paint. Additional objects will become apparent from an examination of the following description and claims.

The objects are attained according to the herein described invention which broadly comprises adding a volatile organic hydrophilic liquid to a pigment water mixture, removing the major portion of the water therefrom, thereafter adding a polar-nonpolar agent and evaporating the solvent liquors.

In a more restricted embodiment this invention comprises displacing substantially all the water from an aqueous suspension of pigment material with a volatile organic hydrophilic liquid, said liquid comprising organic compounds having not more than 8 carbon atoms per molecule and having at least 1 atom per molecule of a member selected from the group consisting of oxygen and nitrogen, treating the dewatered pigment material with a solution comprising a volatile organic hydrophilic liquid and between about 0.1% and about 2%, based on the weight of the pigment, of a polar-nonpolar compound, and thereafter evaporating the solvent liquors.

A preferred embodiment of this invention comprises mechanically displacing substantially all the water from an aqueous pigment suspension with a volatile organic hydrophilic liquid which is capable of dissolving at least 1% of its volume of water and which has a boiling point at atmospheric pressure between about 30° C. and about 200° C., and preferably between about 50° C. and about 150° C., the pigment being treated being substantially insoluble in the volatile organic hydrophilic liquid, treating the resulting dewatered pigment suspension with a liquid solvent of essentially the same composition as employed in the displacement step and containing from about 0.25% to about 1%, based on the pigment weight, of a polar-nonpolar agent, and thereafter removing the solvent liquor by evaporation.

The mechanical displacement of water in this invention refers to such processes as filter washing, decantation, and the like. Thus, the process may start with a filter cake comprising pigment and water, the organic liquid is then passed through the cake either by gravity, suction, or pressure until the water is substantially removed. The very first fraction of water displaced may be discarded since it will contain only small amounts of the organic liquid. As the filtrate becomes richer in the organic liquid it may be saved for a suitable recovery step. Mechanical removal of the water may also be accomplished by mixing the aqueous suspension of pigment with the organic liquid, allowing the pigment to settle, decanting the solution, and repeating the decantation washing until the pigment is substantially water free. A combination of these methods, comprising mixing the aqueous suspension with the organic agent and then removing the liquid by filtration, may also be used to advantage. These steps may be carried out in accordance with the well known countercurrent washing principle in order to obtain greater washing efficiency and reduce the cost of solvent recovery per pound of water removed.

It is not essential that the organic hydrophilic liquid employed in the water displacement step should be absolutely anhydrous nor that the pigment after said displacement step should be completely water free. It is essential, however, that the organic hydrophilic liquid employed should comprise less than about 20% water by volume. Superior results are obtained, when the organic hydrophilic liquid comprises less than about 10% water by volume and preferably less than about 5% water by volume. Furthermore, it is essential that the water displacement step should be sufficiently complete that the liquid phase of the resultant pigment/liquid mixture comprises less than about 20% water by volume. Superior results are obtained when said liquid phase comprises less than about 10% water by volume and preferably less than about 5% water by volume.

Examples of volatile organic hydrophilic liquids which may be employed in this invention are ethyl alcohol, diethyl ether, acetone, butanol, propanol, denatured alcohols, isoamyl acetate, cellosolve, cyclohexanol, diacetyl, dioxan-1,4, dihydroxy butane, dipropyl amine, dipropyl ether, ethyl propionate, formic acid, furfural, glyceryl mono acetate, glyceryl ether, glycol acetate, methyl ethyl ether, methyl ethyl ketone, methyl propionate, propylamine, propylene glycol, propylene glycol monoacetate, propylene oxide, propyl formate, n- and isovaleric acid, methyl cyclohexanol, cyclohexanone, methyl cyclohexanone, and the like. Ethyl alcohol, denatured alcohol, cellosolve, and acetone are preferred. Further, it is to be understood that mixtures of volatile organic hydrophilic liquids may be used.

These liquids are described in this specification and appended claims as "hydrophilic." It is to be understood that this term is capable of degrees of comparison, i. e., some liquids may be more hydrophilic than others. For example, ethyl alcohol is very hydrophilic being completely miscible with water. On the other hand, ethyl ether will not mix with water in all proportions; its hydrophobic character is apparent, but nevertheless, it is hydrophilic inasmuch as it will dissolve a fair amount of water. This ability to dissolve at least small amounts of water is essential to the liquids used in this invention for displacing the water.

When the pigment is satisfactorily dewatered it may then be treated with a solution comprising a solvent chosen from the above class and a suitable amount of a polar-nonpolar compound. After thorough mixing the solvent is evaporated leaving the polar-nonpolar compound on the surface of the pigment. More than one of said polar-nonpolar compounds may be used in one treatment.

Polar-nonpolar compounds contain molecules, one portion of which exhibits polar characteristics while another portion exhibits nonpolar properties. The polar portion of the molecule is generally inorganic in nature and tends to be hydrophilic and lyophobic; the nonpolar portion is organic in nature and is essentially hydrophobic and lyophilic. More particularly, by the term "polar-nonpolar compound" as used herein and in the appended claims I refer to organic compounds in which substantially one extremity of every molecule is of an ionizing character, the other extremity being non-ionizing and substantially oil-miscible; to anion-active compounds having the general formula

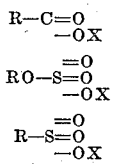

and R—OH, wherein R is an alkyl group (either an alphyl or an aryl group) containing at least 5 carbon atoms and X is hydrogen or a metal; to cation-active aliphatic surface-active compounds yielding positive radicals having an alkyl or substituted alkyl chain containing at least 8 carbon atoms; or to natural or synthetic resins. Such compounds include oleic acid, naphthenic acid, stearyl alcohol, calcium naphthenate, sodium stearate, sulfonated castor oil, sulfonated fatty acids, sodium naphthenate, sulfonated higher alcohols, dodecyl amine, didodecyl amine ethanol, octadecyl trimethyl ammonium bromide, octadecyl betaine, methyl benzyl stearyl sulfonium methyl sulfate, phenol-formaldehyde resins, gum copal, amberol resins, stearyl ammonium trimethyl bromide, benzyl alcohol, phthalic acid and its esters with higher sulfonated alcohols, guanadine, and the like. Since these compounds are to be left on the pigment after evaporation of the solvent, it is desirable that they should be non-volatile and stable at the temperatures used.

Polar-nonpolar compounds outstandingly beneficial and useful in the invention in procuring optimum results comprise those which are relatively water-immiscible. Specifically, these include: cocoanut oil fatty acid (known commercially as "Wecoline AA," comprising a top fraction obtained by the distillation of cocoanut oil fatty acids, a chief component of which is lauric acid); "Lorol" alcohol, comprising a mixture of higher boiling alcohols with about 6 to 18 carbon atoms obtained by processing cocoanut oil; oleic, stearic, naphthenic acids, as well as benzyl amine. Water soluble polar-nonpolar compounds are also advantageously employed, especially where production is desired of a mix-in water-dispersible type of pigment material. Thus, if production is sought of water dispersible titanium oxide, zinc sulfide, lithopone, or similar pigments, they may suitably be treated after the displacement of the water therefrom with a solution of a water-soluble polar-nonpolar compound dissolved in a volatile organic hydrophilic liquid in accordance with this invention. Compounds especially useful for this purpose include monobutylamine, triethanolamine, and the dioctyl ester of sodium sulfosuccinate.

The optimum amount of polar-nonpolar compound employed can best be learned by experimental trial and will depend to a large extent on the character of the pigment material under treatment, the type of polar-nonpolar agent employed, and the use requirements of the finished pigment material. Appreciable effects are had from the employment of as little as about 0.05% on the basis of the pigment material weight, of polar-nonpolar compound. For increased effects as much as about 5% of polar-nonpolar compound may be used. Ordinarily, amounts in excess of about 5% have no beneficial effect, and in many instances are actually detrimental. Preferably, on account of the superior results thereby obtained, the amount of polar-nonpolar compound employed is in the range of from about 0.1% to about 2%, on the bases of the pigment material weight, and for optimum results is in the range of from about 0.25% to about 1%.

In drying the treated pigment, temperatures in excess of about 200° C. should be avoided. In most instances, because of the superior results thereby obtained, a temperature of less than about 180° C., preferably less than 150° C., should be used. The dried pigment obtained by this novel process is in a relatively soft and powdery condition. The polar-nonpolar agent is distributed uniformly over the surface of the individual pigment particles and prevents their cementation during the drying process. As a consequence, simple dry milling comminutes the dried pigment so that on simple mixing in paint vehicle it is reduced substantially to the state of subdivision existent in the aqueous pigment slurry prior to the dewatering process. Dry milling by disintegrating as in a rotary hammer mill is preferred, although pulverizing as in a ring roll mill may be resorted to.

The solvent used to carry the polar-nonpolar agent may be any volatile organic hydrophilic liquid although it is desirable that it should be of the same composition as that used for displacing the water. It is also possible to obtain improved results over the prior art by simply mixing the polar-nonpolar agent into the dewatered paste. The agent then dissolves in this liquid giving a similar action to that when it is added in a separate portion of the solvent.

This invention may be more readily understood from an examination of the following examples which are given for illustrative purposes and are not intended to place any restrictions or limitations on the herein described invention.

*Example I*

2640 grams of an aqueous titanium dioxide slurry substantially free from pigment particles having diameters in excess of about 6 microns and containing 1000 grams of titanium dioxide, or about 38% solids, was filtered until the filter cake contained about 65% solids. This filter cake was mixed thoroughly with two liters of denatured alcohol and the slurry was filtered. While still on the filter, the cake was washed with two more liters of denatured alcohol to remove practically all the water present. The dewatered filter cake comprising about 65% $TiO_2$ was transferred to a glass jar and thoroughly mixed by a portable agitator with 5 grams of stearic acid dissolved in 250 cc. of denatured alcohol. The resulting paste was then dried at 70° C. and the dry pigment passed through a squirrel cage disintegrator.

*Example II*

Another sample of aqueous pigment suspension was treated exactly as in Example I except that benzyl alcohol was substituted for the stearic acid.

*Example III*

Example I was again repeated using stearyl ammonium trimethyl bromide in place of the stearic acid.

*Example IV*

Still another repetition of Example I was made using water white rosin in place of the stearic acid.

*Example V*

Example II was repeated, but acetone in amount equal to twice the weight of pigment was used for repulping the aqueous suspension, and a further equal weight of acetone was used for washing on the filter. A 5% solution of benzyl alcohol in acetone containing 5 grams of the agent was mixed with the dewatered pigment cake. This paste was dried at 85° C. and the pigment ground in a rotary hammer mill.

In order to test the products of Examples I to V inclusive, they were compared with pigments prepared by similar methods, as shown in the following examples:

Example VI

Examples I to V were repeated but the second step, namely, the incorporation of the polar-nonpolar treating agent, was omitted. These samples were saved for comparative tests.

Example VII

Examples I to V were again repeated but the first step, namely, the mechanical displacement of the water by the organic liquid, was omitted. The aqueous pigment suspensions were mixed with the non-aqueous solutions of the polar-nonpolar agent and the water and solvent evaporated together by drying just under 100° C. These pigments were also comparatively tested.

Example VIII

A sample of aqueous titanium dioxide filter cake was dried, and disintegrated, for comparison with the other pigments.

When the pigments prepared under Examples I to V were incorporated in a suitable gloss paint formulation they exhibited excellent mixing, wetting, and gloss characteristics. The samples under Example VI although having good particle size and being free of grit, did not mix easily and were not well wet by the vehicle. As a result of this poor wetting the particles tended to flocculate generating aggregates which broke the smooth glossy appearance of the film. The samples prepared under Example VII while having good mixing and wetting properties, contained relatively large grit particles which also decreased the gloss of the resulting paint film. The untreated, water-dried sample of Example VIII was difficult to incorporate in the vehicle, showed poor wetting and dispersion, and the resulting film had poor gloss, the film surface being actually gritty in appearance.

The pigments prepared according to the foregoing examples were tested by the herein described "Mix-in pigment particle size," "Film particle count," "Texture," and "Paint grit" tests and the following results were obtained—

| | Mix-in pigment particle size | Film particle count | Texture | Paint grit |
|---|---|---|---|---|
| Examples I–V | 4 to 6 | 0 to 20 | 16 to 17 | 17 to 18 |
| Example VI | 18 to 20 | About 100 | 12 to 14 | 11 to 13 |
| Example VII | 20 to 30 | About 175 | 11 to 12 | 9 to 10 |
| Example VIII | Above 50 | Above 200 | 11 | 8 |

The products of this novel process, namely the products of Examples I–V, produced high quality enamel paints when simply mixed in paint vehicles, whereas enamel paints of comparable fineness and texture could only be had with the products of Examples VI and VII after prolonged and severe milling of said pigments in the paint vehicle.

It is to be understood that the herein described specific embodiments of this invention may be subjected to variation and modification without departing from the spirit and scope thereof.

Thus, although the foregoing examples deal only with titanium dioxide pigments, this invention is applicable to the similar processing of other pigments and extenders such as zinc white, lithopone, zinc sulfide, zirconium oxide, barium titanium silicate, barium sulfate, calcium sulfate, calcium sulfite, calcium carbonate, magnesium silicates, clay, alumina, silica, calcium fluoride, and the like, and also ultramarine blue, chrome yellow, basic zinc chromate, chrome red, chrome orange, iron blue, earth colors such as iron oxide, ferrous carbonate, and the like, as well as admixtures thereof.

This invention applies to any aqueous suspension of pigment materials. If the pigment is of the type which is ordinarily calcined, it is desirable that the treatment be applied to the pigment after calcination. Thus, pigments are frequently calcined and then wet ground to a desired fineness and the ground slurry may be filtered and treated according to this invention thereby preserving the fineness. When no calcination is employed the ground or precipitated and washed pigment material may serve as a starting material for this process. While the herein described process is adapted to the treatment of aqueous slurries of pigment materials comprising primary pigment particles of all sizes, it is to be understood that the optimum benefits are obtained when said aqueous slurries are substantially free from primary pigment material particles having diameters in excess of about 15 microns.

The recovery of the organic liquids is not a part of this invention but for the economic operation of the process such recovery steps may be employed. The choice of liquid may be influenced by its ease of recovery. Distillation will probably be the most commonly used method inasmuch as the liquids used must be at least partially miscible with water. However, when the liquid used has a relatively low water miscibility such as ether, a partial separation by decantation may be employed when the washings exist in a two layer system; each layer may then be fractionally distilled or the organic-rich layer may be freed of its water content by absorbing or desiccating agents such as silica or alumina gels, calcium chloride, sulfuric acid, quick lime, and the like.

Although the pigments which have been dewatered with the herein described organic liquids have good free flowing characteristics, the surface of the pigment particles still retains its original lyophobic character and in most inorganic pigments this is strong enough to prevent good wetting by oily vehicles. By incorporating the polar-nonpolar agents in the last portion of solvent and then drying, the pigment surface is coated with the agent. It is believed that the polar portion of the molecule, being hydrophilic, is attracted by the naturally hydrophilic surface of the pigment. Due to this attraction, the agent distributes itself in a film over the pigment particles in such a way that the outer film surface, which is presented to the paint vehicle during mixing, is lyophilic and, therefore, easily wet by the vehicle. This improved wetting causes better dispersion of the pigments with the consequent improvement in such properties as hiding power, gloss, durability, and brightness. In the process of this invention the individual or primary pigment particles receive the agent prior to drying which results in the improved properties herein described.

The ready adaptability to direct mix-in which pigment materials treated in accordance with this invention afford will be evident at once upon evaluation and testing such treated substances in accordance with the mix-in pigment particle size and film particle count tests referred to. Prior art pigment materials exhibit mix-in pigment particle size values in excess of substantially 20 microns and film particle count values ranging from about 100 to in excess of 200. In order to render such pigment materials useful in paint compositions they must be milled for prolonged periods in the coating composition vehicle. In the present invention, on the other hand, treatment of the pigment material affords attainment of a product which will meet all mix-in pigment particle size and film particle count test requirements. The product thus becomes admirably suited for direct use and without any further grinding in the vehicle as a mix-in pigment. For instance, by following the teachings set out herein, pigment materials can be produced which never exhibit a mix-in pigment particle size value in excess of substantially 15 microns or a film particle count value in excess of about 60. Usually, this novel process produces pigment materials exhibiting mix-in pigment particle size values not exceeding substantially 8 microns, and preferably not exceeding substantially 6 microns, with film particle count values not in excess of about 40, and preferably not in excess of about 25. This novel process allows the production of pigment materials, particularly pigment titanium dioxide, which are finely divided to an extent heretofore unrealized by any commercially practicable prior art process or combination of processes, and which, without recourse to the paint milling operation required with prior art pigment materials, may be incorporated in a paint vehicle by simple mixing to produce a paint which forms films of smooth unbroken surface without any irregularities visible to the naked eye. Furthermore, pigment materials of any predetermined particle size may be produced by my process thus permitting the formulation of paints by simple mixing which will yield films of any predetermined gloss characteristics and of smooth unbroken surface.

Pigments treated by this process are found to have very good utility in the preparation of paints, especially gloss paints. Fields other than the paint industry, such as the manufacture of pigmented rubber, pigmented plastics, pigmented waxes, and the like, may employ the improved pigment materials to advantage.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for the production of pigments adapted for direct use through simple mix-in coating compositions and having a mix-in particle size value not in excess of substantially 15 microns, the steps which comprise displacing substantially all the water from a pigment water mixture with a non-aqueous volatile organic hydrophilic liquid, adding to the resulting dewatered pigment a polar-nonpolar compound, and thereafter removing the non-aqueous solvent liquors from the substantially non-aqueous treated pigment by evaporation.

2. In a process for the production of pigments adapted for direct use through simple mix-in coating compositions and having a mix-in particle size value not in excess of substantially 15 microns, the steps which comprise displacing substantially all the water from a pigment water mixture with a non-aqueous volatile organic hydrophilic liquid boiling between about 30° C. and about 200° C., adding to the resulting dewatered pigment a solution comprising a volatile organic hydrophilic liquid and a polar-nonpolar compound, and thereafter removing the non-aqueous solvent liquors from the substantially non-aqueous treated pigment by evaporation.

3. In a process for the production of pigments adapted for direct use through simple mix-in coating compositions and having a mix-in particle size value not in excess of substantially 15 microns, the steps which comprise mechanically displacing substantially all the water from an aqueous pigment suspension with a volatile organic hydrophilic liquid which has a boiling point between about 50° C. and 150° C., adding to the resulting dewatered pigment a solution comprising a volatile organic hydrophilic liquid and a polar-nonpolar compound, and thereafter removing the non-aqueous solvent liquors from the substantially non-aqueous treated pigment by evaporation.

4. In a process for the production of pigments adapted for direct use through simple mix-in coating compositions and having a mix-in particle size value not in excess of substantially 15 microns, the steps which comprise mechanically displacing substantially all the water from an aqueous pigment suspension with a volatile organic hydrophilic liquid, said liquid comprising organic compounds having not more than 8 carbon atoms per molecule and having at least 1 atom per molecule of a member selected from the group consisting of oxygen and nitrogen, adding to the resulting dewatered pigment a volatile organic hydrophilic liquid containing a polar-nonpolar compound and thereafter removing the non-aqueous solvent liquor from the substantially non-aqueous treated pigment by evaporation.

5. In a process for the production of pigments adapted for direct use through simple mix-in coating compositions and having a mix-in particle size value not in excess of substantially 15 microns, the steps which comprise mechanically displacing substantially all the water from an aqueous suspension with a volatile organic hydrophilic liquid, said liquid comprising organic compounds having not more than 8 carbon atoms per molecule and having at least 1 atom per molecule of a member selected from the group consisting of oxygen and nitrogen, adding to the resulting dewatered pigment a liquid solvent of essentially the same composition as that employed in the displacement step and containing a polar-nonpolar compound, and thereafter removing the non-aqueous solvent liquor from the substantially non-aqueous treated pigment by evaporation.

6. In a process for the production of pigments adapted for direct use through simple mix-in coating compositions and having a mix-in particle size value not in excess of substantially 15 microns, the steps which comprise mechanically displacing substantially all the water from an aqueous pigment suspension with a volatile organic hydrophilic liquid which is capable of dissolving at least 1% of its volume of water and which has a boiling point at atmospheric pressure between about 50° C. and about 150° C., adding to the resulting dewatered pigment a liquid solvent of essentially the same composition as employed in the displacement step and containing from about 0.1% to about 2%, based on the weight of the pigment, of a polar-nonpolar agent, and thereafter removing the non-aqueous solvent liquor from the substantially non-aqueous treated pigment by evaporation.

CURTIS MARSHALL DANN.

CERTIFICATE OF CORRECTION.

Patent No. 2,287,416.                        June 23, 1942.

CURTIS MARSHALL DANN.

It is hereby certified that error appears in the printed specification of the above numbered patent requiring correction as follows: Page 7, first column, lines 54 and 66, and second column, lines 5, 20, 38 and 57, claims 1 to 6 inclusive, before the word "coating" insert --in--; and that the said Letters Patent should be read with this correction therein that the same may conform to the record of the case in the Patent Office.

Signed and sealed this 1st day of September, A. D. 1942.

(Seal)                                        Henry Van Arsdale,
                                            Acting Commissioner of Patents.